United States Patent [19]

Imazeki et al.

[11] 4,334,281
[45] Jun. 8, 1982

[54] COMMAND GENERATION SYSTEM FOR GENERATING A SMOOTH COMMAND SIGNAL

[75] Inventors: Ryoji Imazeki; Etsuo Yamazaki; Takao Sasaki, all of Hachioji, Japan

[73] Assignee: Fujitsu Fanuc Limited, Tokyo, Japan

[21] Appl. No.: 129,562

[22] Filed: Mar. 12, 1980

[30] Foreign Application Priority Data

Mar. 15, 1979 [JP] Japan ................................ 54-30372

[51] Int. Cl.³ ............................................. G05B 19/25
[52] U.S. Cl. ..................................... 364/723; 318/573
[58] Field of Search ......................... 364/723; 318/573

[56] References Cited

U.S. PATENT DOCUMENTS

| | | | |
|---|---|---|---|
| 3,109,092 | 10/1963 | Lott et al. ............................ | 364/723 |
| 3,459,926 | 8/1969 | Heilweil et al. ..................... | 364/719 |
| 3,757,095 | 9/1973 | Kiwiet ............................... | 318/573 X |
| 3,825,735 | 7/1974 | Bowers et al. ...................... | 318/573 |
| 3,943,343 | 3/1976 | Irie .................................... | 318/573 X |

Primary Examiner—David H. Malzahn
Attorney, Agent, or Firm—Staas & Halsey

[57] ABSTRACT

In a system which calculates a digital quantity at known time intervals and converts the calculated result to analog form to apply a command, for example, to a numerical-controlled machine tool, there is provided a circuit which obtains a difference value between current and previous calculated results and outputs a value obtained by dividing the difference value by N, and an adder which adds the output from the dividing circuit to the previous calculated result at time intervals of 1/N of the known time interval. The added result by the adder is converted to analog form at time intervals of 1/N of the known time interval to issue the command; as a consequence, the command does not change abruptly but undergoes a smooth change, eliminating the possibility of a great shock being imparted to controlled equipment, for example, a numerical-controlled machine tool.

5 Claims, 3 Drawing Figures

COMMAND GENERATION SYSTEM FOR GENERATING A SMOOTH COMMAND SIGNAL

BACKGROUND OF THE INVENTION

1. Field of the Invention

This invention relates to a command generation system by which a command to a numerical-controlled machine tool or the like can be generated smoothly so that the command undergoes a smooth and substantial change.

2. Description of the Prior Art

In a system which calculates a given digital quantity in a predetermined relation and converts the calculated result to analog form to apply a command to a controlled object, such as, for example, a numerical control equipment, it is sometimes necessary (according to the characteristics of the controlled object) to generate a command so that the command value may vary smoothly, that is, may not undergo an abrupt change. A typical example is a velocity command value which is applied to a servo system of a numerical-controlled machine tool. In this case, a rapid change in the velocity command value results in the machine tool being subjected to a great shock, and hence is not preferred. In general, however, since a certain period of time is required for a digital arithmetic unit to output a calculated result, if an increase or decrease in the calculated result is abrupt as compared with the time needed for the calculation, then the difference becomes great between the calculated result obtained at a certain point of time and the immediately preceding calculated result, and the resulting command value supplied from a D/A converter to the controlled object inevitably undergoes a substantial change. This must be avoided for the reason mentioned above.

SUMMARY OF THE INVENTION

It is therefore an object of this invention to provide a command generation system, which overcomes the abovesaid defect of the prior art and ensures that a smooth command is generated, in a system of the type that calculates a given digital quantity and converts the calculated result to analog form to apply a command to a controlled object.

DESCRIPTION OF THE PREFERRED EMBODIMENTS

Figure 1:
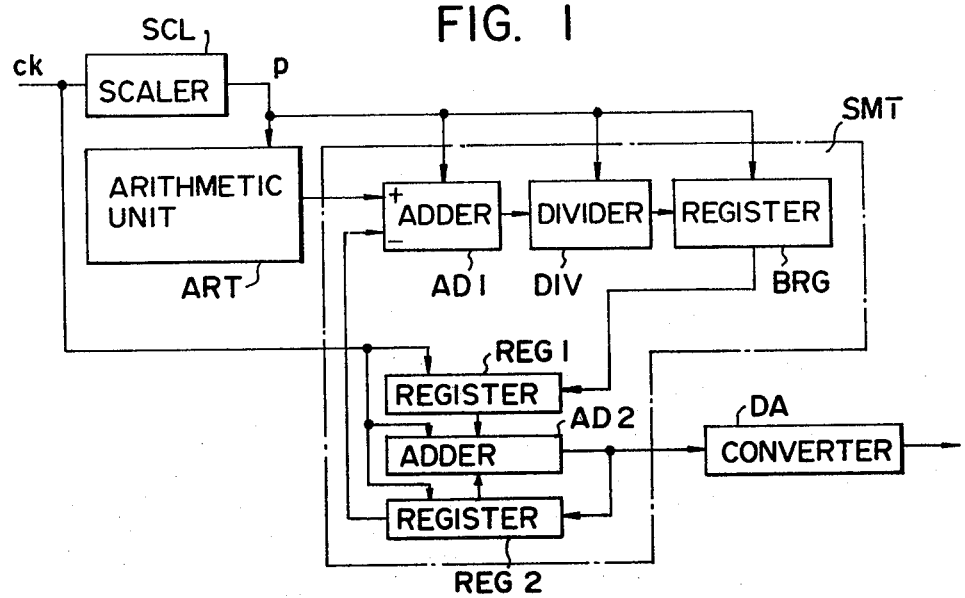
FIG. 1 is a block diagram illustrating, by way of example, the principal part of a system embodying this invention.

FIG. 1 is a block diagram illustrating, by way of example, the principal part of a system embodying the present invention. Reference character ART indicates a digital arithmetic unit; AD1 and AD2 designate adders; DIV identifies a divider, BRG denotes a buffer register, REG1 and REG2 represent registers; SCL shows a scaler; DA refers to a D/A converter; and ck indicates an operation clock. In the prior art, the output from the digital arithmetic unit ART is provided directly to the D/A converter, but in the present embodiment, there is provided between them a smoothing circuit SMT composed of the adders AD1 and AD2, the divider DIV, the buffer register BRG, and the registers REG1 and REG2, so that the calculated output from the digital arithmetic unit ART is applied via the smoothing circuit SMT to the D/A converter DA.

The digital arithmetic unit ART performs four operations of predetermined digital quantities by digital means, and outputs the calculated result in digital form, just like an arithmetic unit employed in numerical control equipment. When supplied with a signal p obtained by frequency dividing the operation clock ck by N in the scaler SCL, the digital arithmetic unit ART provides the calculated result to the one input terminal of the adder AD1 and starts the next computation. To the other input terminal of the adder AD1 is supplied the content of the register REG2, and in the adder AD1 there is obtained a difference value between the calculated result of the digital arithmetic unit ART and the content of the register REG2. The difference value thus obtained is applied to the divider DIV, wherein it is divided by N, and the divided output is set in the buffer register BRG. Such an operation is carried out synchronously with the signal p obtained by frequency dividing the operation clock ck by N. In the period in which the signal p is not applied, the adder AD1 and the divider DIV stop their operation, and the buffer register BRG stores the value of 1/N of the difference value.

On the other hand, the content of the buffer register BRG is applied to the register REG1, and upon reception of the operation clock ck, the adder AD2 adds together the contents of the registers REG1 and REG2 and provides the sum to the D/A converter DA and, at the same time, rewrites the content of the register REG2 with the sum. Thereafter, the above operations are repeated upon each application of the operation clock ck.

Figure 2A:
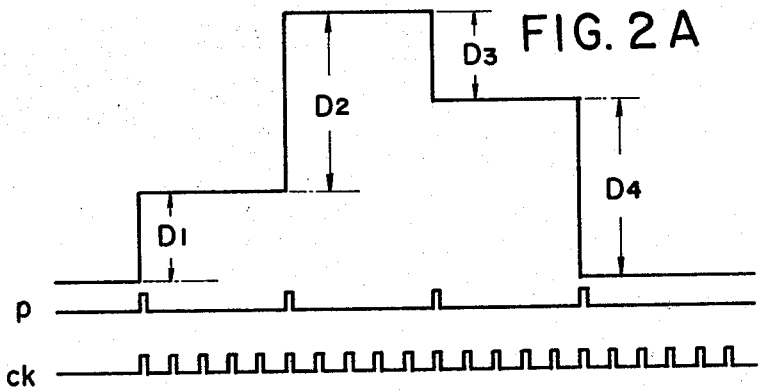
FIG. 2A and FIG. 2B show a series of waveform diagrams explanatory of the operation of the system shown in FIG. 1.
Figure 2B:
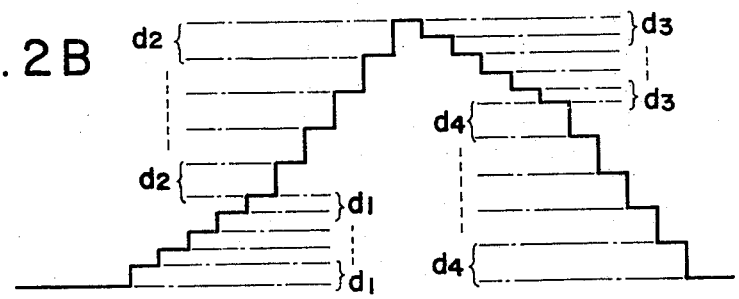

The present embodiment has a construction as described above. Accordingly, even if the computed result of the digital arithmetic unit ART undergoes a substantial change, for example, as shown in FIG. 2(A), values $d_1$ to $d_4$ which are 1/N (N=5 in the illustrated example) of difference values $D_1$ to $D_4$ between the computed result and the immediately preceding one are obtained with the adder AD1 and the divider DIV, and in the adder AD2, the values $d_1$ to $d_4$ are added to the immediately preceding computed result upon each occurrence of the operation clock ck, providing the sum to the D/A converter DA. As a consequence, the input signal to the D/A converter DA becomes such, for example, as shown in FIG. 2(B), with the result that the output signal from the D/A converter DA becomes smooth.

As has been described in the foregoing, according to the present invention, in a system that calculates a digital quantity at known time intervals and converts the calculated result to analog form to issue a command, a value obtained by dividing the difference between current and previous calculated results by N is added to the previous calculated result at time intervals of 1/N of the known time interval, and the sum is provided to the D/A converter to issue the command. Even if the calculated result by the digital arithmetic unit greatly varies for each calculation, a smooth command can be issued at all times. Accordingly, the present invention is of great utility when employed, for instance, in a numerical control equipment or the like.

It will be apparent that many modifications and variations may be effected without departing from the scope of the novel concepts of this invention.

We claim:

1. A command generation system, operatively connected to receive a clock signal including clock pulses, which periodically calculates values of a digital quantity at known time intervals and converts the calculated result to analog form to issue a command, said command generation system comprising:

scaler means, operatively connected to receive the clock signal and having a predetermined scaler integer value N, for generating a timing signal when the number of clock pulses received divided by the predetermined scaler value N results in an integer;

means, operatively connected to said scaler means, for obtaining a difference value between current and previous calculated values of the digital quantity and for outputting said difference value divided by N whenever the timing signal is received; and an adder, operatively connected to receive the clock signal, for adding the output from said difference value obtaining means to the previous calculated result and for generating an added result at the receipt of each clock pulse; and means, operatively connected to said adder for converting the added result to analog form, whereby said command generation system, at time intervals equal to 1/N of the known time interval, issues the command.

2. A command generation system, operatively connected to an operation clock for generating an operation clock signal including clock pulses, a digital arithmetic unit for outputting a series of clocked commands, and a digital-to-analog converter, wherein said arithmetic unit is operatively connected to receive a timing signal, said command generation system comprising:

scaler means, having an input operatively connected to the operation clock, and having an output, for outputting the timing signal which is N times slower than the clock pulses of the operation clock signal, the timing signal being applied to said digital arithmetic unit;

first adder means, having a first input operatively connected to said digital arithmetic unit, having a second input, having a third input operatively connected to the output of said scaler means, and having an output, for outputting the difference between each of the clocked commands outputted by said digital arithmetic unit and the respective clocked command immediately preceding at the time when the timing signal is received;

division means, having a first input operatively connected to said first adder means, having a second input operatively connected to the output of said scaler means, and having an output, for outputting the outputs of said first adder means divided by N whenever the timing signal is received;

second adder means, having a first input operatively connected to said division means, having a second input operatively connected to the operation clock, and having an output, operatively connected to said digital-to-analog converter, for outputting, at the receipt of each of the clock pulses, the most recent preceding clocked command generated by said digital arithmetic unit, the most recent preceding clocked command cumulatively increased at the receipt of each of the clock pulses by the output of said division means, a cumulatively increased preceding clock command is thereby output as a digital command input to the digital to analog converter.

3. A command generation system as recited in claim 2, wherein said second adder means comprises a buffer register having a buffer input, operatively connected to said division means, for storing the output of said division means prior to adding in said second adder means.

4. A command generation system as recited in claim 3, wherein said first adder means comprises a register, having an input operatively connected to the output of said second adder means, for storing the cumulatively increased preceding command prior to calculating said difference by said first adder means.

5. The device of claim 4, wherein the commands generated by said digital arithmetic unit are velocity commands, and wherein said output of said second adder means is operatively connected to said digital-to-analog converter to control positioning of a machine tool element.

* * * * *

UNITED STATES PATENT AND TRADEMARK OFFICE
CERTIFICATE OF CORRECTION

PATENT NO. : 4,334,281
DATED : June 8, 1982
INVENTOR(S) : Imazeki et al

It is certified that error appears in the above-identified patent and that said Letters Patent is hereby corrected as shown below:

Column 1, line 61,"," should be --;-- (both occurrences).

Column 2, line 56, after "that" insert --periodically--.

Signed and Sealed this

Twelfth Day of October 1982

[SEAL]

Attest:

GERALD J. MOSSINGHOFF

Attesting Officer

Commissioner of Patents and Trademarks